(12) United States Patent
Nadamoto et al.

(10) Patent No.: US 7,725,487 B2
(45) Date of Patent: May 25, 2010

(54) CONTENT SYNCHRONIZATION SYSTEM AND METHOD OF SIMILAR WEB PAGES

(75) Inventors: Akiyo Nadamoto, Koganei (JP); Katsumi Tanaka, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 1939 days.

(21) Appl. No.: 10/724,668

(22) Filed: Dec. 1, 2003

(65) Prior Publication Data
US 2005/0120114 A1 Jun. 2, 2005

(51) Int. Cl.
G06F 7/00 (2006.01)
G06F 17/00 (2006.01)
(52) U.S. Cl. ...................... 707/769; 707/758
(58) Field of Classification Search ............. 707/3, 707/769, 758
See application file for complete search history.

(56) References Cited

U.S. PATENT DOCUMENTS

| | | | | |
|---|---|---|---|---|
| 6,009,459 | A * | 12/1999 | Belfiore et al. | 709/203 |
| 6,061,719 | A * | 5/2000 | Bendinelli et al. | 709/218 |
| 6,154,737 | A * | 11/2000 | Inaba et al. | 707/3 |
| 6,178,420 | B1 * | 1/2001 | Sassano | 707/6 |
| 6,185,614 | B1 * | 2/2001 | Cuomo et al. | 709/224 |
| 6,671,683 | B2 * | 12/2003 | Kanno | 707/5 |
| 6,754,873 | B1 * | 6/2004 | Law et al. | 715/208 |
| 6,941,321 | B2 * | 9/2005 | Schuetze et al. | 707/103 R |
| 7,219,162 | B2 * | 5/2007 | Donker et al. | 709/245 |
| 7,308,439 | B2 * | 12/2007 | Baird et al. | 707/3 |
| 7,353,246 | B1 * | 4/2008 | Rosen et al. | 709/202 |
| 7,493,252 | B1 * | 2/2009 | Nagano et al. | 704/9 |
| 2004/0049728 | A1 * | 3/2004 | Langford | 715/501.1 |
| 2004/0225667 | A1 * | 11/2004 | Hu et al. | 707/100 |
| 2005/0010559 | A1 * | 1/2005 | Du et al. | 707/3 |
| 2005/0108001 | A1 * | 5/2005 | Aarskog | 704/10 |
| 2006/0149721 | A1 * | 7/2006 | Langford | 707/3 |
| 2007/0061313 | A1 * | 3/2007 | Kahle et al. | 707/3 |

FOREIGN PATENT DOCUMENTS

EP 810535 A2 * 12/1997

OTHER PUBLICATIONS

Bing Liu et al., "Visualizing Web Site Comparisons", May 7-11, 2002, Honolulu, Hawaii, pp. 1-18.
Taher H. Haveliwala et al., "Evaluating Strategies for Similarity Search on the Web", May 7-11, 2002, Honolulu, Hawaii, pp. 1-23.
Jeffrey Dean et al., "Finding Related Pages in the World Wide Web", May 1999, Abstract pp. 1-2.

* cited by examiner

*Primary Examiner*—John E Breene
*Assistant Examiner*—Joshua Bullock

(57) ABSTRACT

The present claimed invention is a synchronized comparison and present system that presents a similar Web page, when a page in a Web site is presented, in a different site based on a search keyword automatically obtained in the page simultaneously and automatically and also controls a display mode of the similar page to be synchronous with a display mode of a basic Web page.

16 Claims, 12 Drawing Sheets

| Table Name | Item Name | Explanation |
|---|---|---|
| T_DOMAIN | | Domain Table |
| | DOMAIN | Domain Name |
| | STATUS | Process Flag |
| T_URL | | URL Table |
| | URL | URL |
| | TREE | Hierarchy Number |
| | PARENT_URL | Parent Page URL |
| | DOMAIN | Domain Table |
| | FLAG | Process Flag |
| T_PARAGRAPH | | Paragraph Table |
| | URL | URL |
| | PARAGRAPH_NO | Paragraph Number |
| | TYPE | Paragraph Type |
| | R_TITLE_NO | Title Paragraph Number |
| | R_SUBTITLE_NO | Subtitle Paragraph Number |
| | R_CONTENTS_NO | Content Paragraph Number |
| | PARAGRAPH | Paragraph Character String |
| | TEXT | Text |
| T_WORD | | Word Table of Title and Subtitle |
| | URL | URL |
| | PARAGRAPH_NO | Paragraph Number |
| | WORD_TYPE | Word Type |
| | PARAGRAPH_TYPE | Paragraph Type |
| | WORD | Word |
| T_KEYWORD_SUBJECT | | Subject Keyword Table |
| | URL | URL |
| | PARAGRAPH_NO | Paragraph Number |
| | KEYWORD_ORDER | Keyword Order |
| | KEYWORD | Keyword |
| T_KEYWORD_CONTENTS | | Content Keyword Table |
| | URL | URL |
| | PARAGRAPH_NO | Paragraph Number |
| | KEYWORD_ORDER | Kayword Order |
| | KEYWORD | Keyword |

*Fig. 8*

Anchor clicking with content-synchronization

Scrolling a page with content-synchronization

Forward and Backward Navigation (4) Highlighting Common Words

CONTENT SYNCHRONIZATION SYSTEM AND METHOD OF SIMILAR WEB PAGES

BACKGROUND OF THE INVENTION

1. Field of the Invention

This invention relates to a content synchronization system and method of similar Web pages to display a basic Web page and similar Web pages similar to the basic Web page in an easily viewable manner.

2. Description of the Related Art

Presently, more than 36 million Web sites exist on the Internet. There are a great number of web sites consisting of more than 10,000 Web pages, which makes Web sites voluminous. To own a Web site is considered to be a matter of course for companies or universities. Accordingly, these Web sites can be classified into a similar field or a category of business, such as a portal site or a news site.

In order to compare pages of similar Web sites, a specific Web page is searched in a compared site or a page to be accessed is searched for each Web site and presented and then a comparison has to be made manually. For example, in order to compare how a news article is described for each site, a user has to open each site individually though a discrete Web Browser and to present related pages respectively and read them. Under such circumstances, it is difficult for a user to make a comparison on multiple sites.

Consequently, Dean et al. conducted a study to search a page related with a content of the Web page shown by a URL by means of giving the URL as search information. Their study makes use of not a content of the Web page itself but link information only or makes use of a description of customary information.

Taher. H et al. conducted a study in which a brother page of an input URL is searched by mans of a relationship between a parent page of the input URL and a child page quoted by the parent page by making use of a Web page link tree and ten nodes that are quoted most frequently are considered to be related pages.

However, since related information is obtained based on link information in either of these studies, a reliability to obtain similar pages is low and similar pages are just obtained and how to control a display mode of the similar pages is not mentioned.

BRIEF SUMMARY OF THE INVENTION

The present claimed invention intends to make it possible for a user to read multiple similar sites in an easily viewable manner, when a page in a Web site is presented, by presenting a similar Web page in a different site based on a search keyword automatically obtained from the page simultaneously and automatically and also controlling a display mode of the similar page to be synchronous with a display mode of a basic Web page.

More concretely, as shown in FIG. 1, the present claimed invention relates to a content synchronization system of similar Web pages comprising a basic Web page specify portion that receives an identifier of a basic Web page as a Web page to be a basis of display and specifies the basic Web page, a compared Web site specify portion that receives an identifier of a compared Web site as a similar content of the basic Web page, a keyword extract portion that extracts a keyword in the basic Web page specified by the basic Web page finding portion, a similar Web page finding portion that specifies one or multiple similar Web pages that are similar to an entire part or a part of the basic Web page in the compared Web sites based on the keyword extracted by the keyword extract portion and a Web page display control portion that displays the similar Web pages specified by the similar Web page finding portion together with the basic Web page and synchronized with an operation of a user to the basic Web page. In the present claimed invention, a Web site to be a basis is called a basic Web site and a Web site to be compared is a compared Web site. In addition, a Web page in the basic Web site specified by a user is called the basic Web page and a Web page in a compared Web site similar to the basic Web page is called a similar Web page.

BRIEF DESCRIPTION OF THE SEVERAL VIEWS OF THE DRAWING

FIG. 8 is a table diagram showing a table structure of a Web configuration database in accordance with the embodiment.

DETAILED DESCRIPTION OF THE INVENTION

An embodiment of the present claimed invention will be described in detail with referring to the accompanying drawings.

Figure 1:
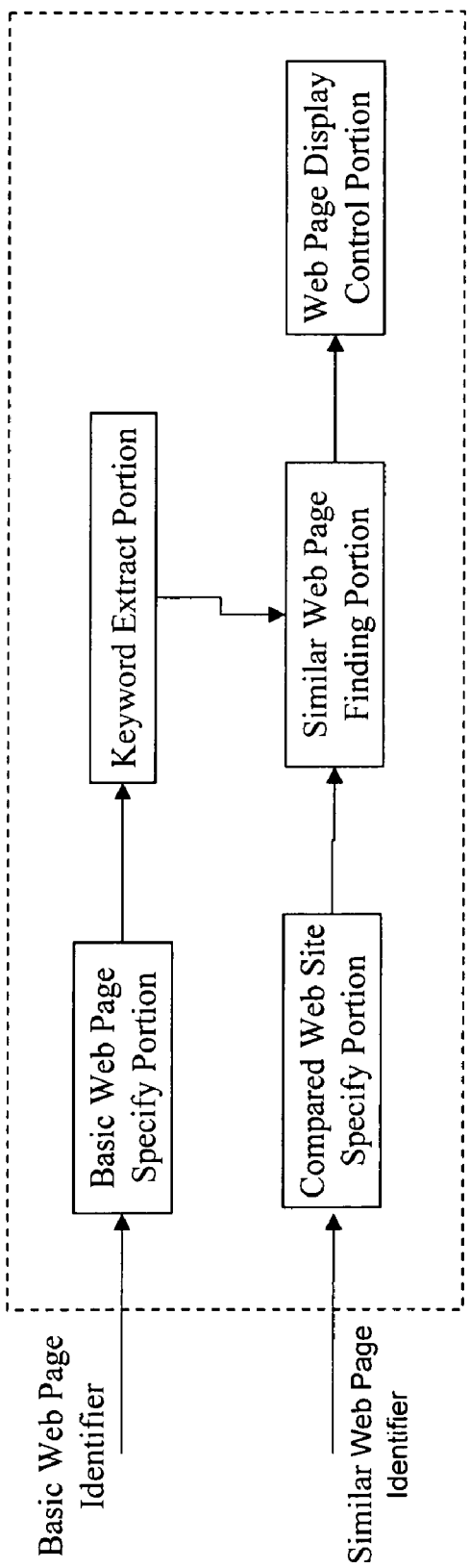
FIG. 1 is a block diagram showing a configuration of the invention in accordance with claim 1.
Figure 2:
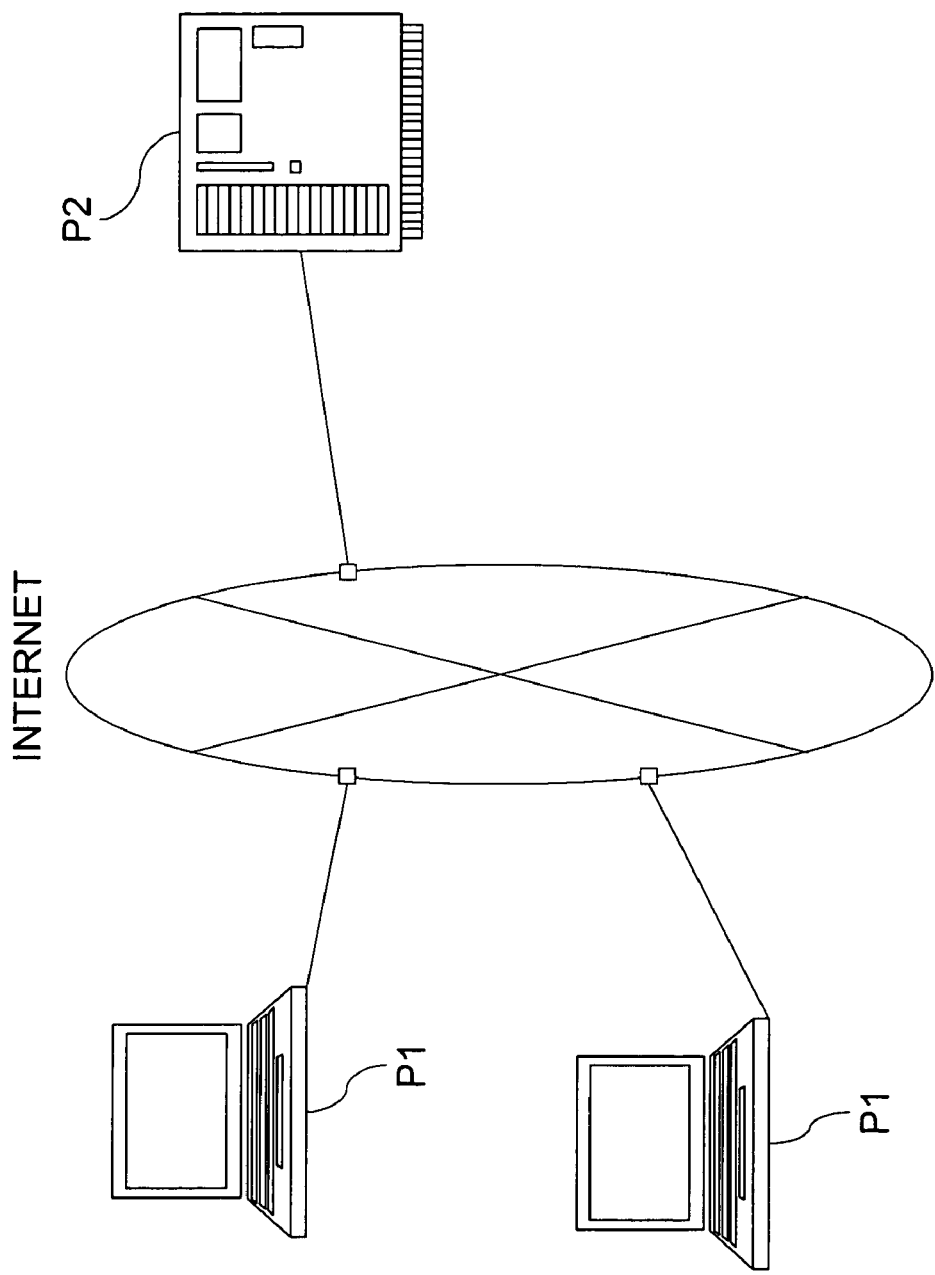
FIG. 2 is a pattern diagram of an equipment configuration of a content synchronization system of similar Web pages in accordance with an embodiment of the present claimed invention.

FIG. 2 is a diagram of an equipment configuration of a content synchronization system of similar Web pages in accordance with the embodiment. This system is so arranged that a terminal computer P1 (a terminal unit) to be used by a client is connected with a center computer P2 (a information processing unit) in a communicable manner and each computer is connected with the Internet.

Figure 3:
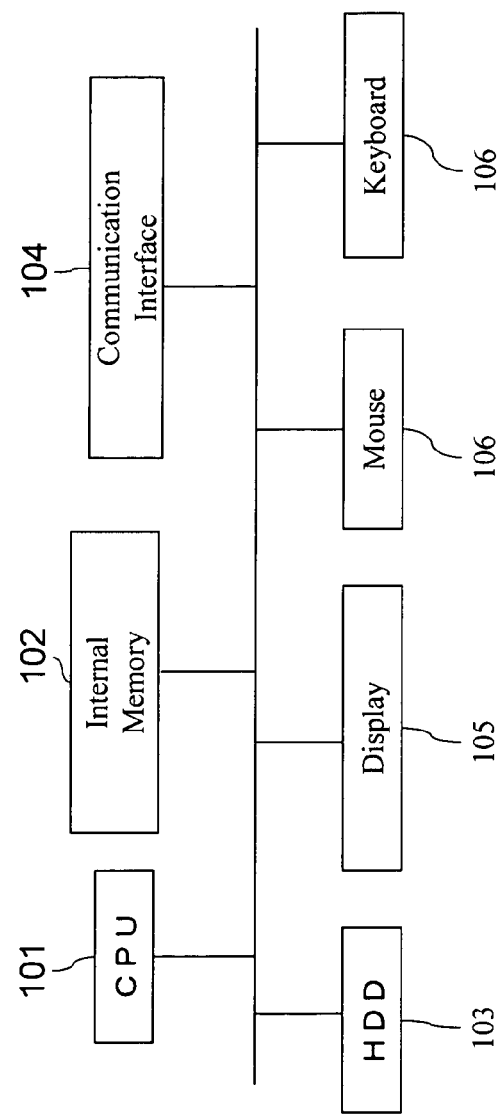
FIG. 3 is a pattern diagram of an equipment configuration showing an internal configuration of a terminal computer in accordance with the embodiment.

The terminal computer P1 is a multi-purpose computer having, for example, a browsing function and comprises, as shown in FIG. 3, a CPU 101, an internal memory 102, an external memory unit 103 such as an HDD, a communication interface 104 such as a modem to connect with a communication network, a display 105 and an input means 106 such as a mouse or a keyboard.

Figure 4:
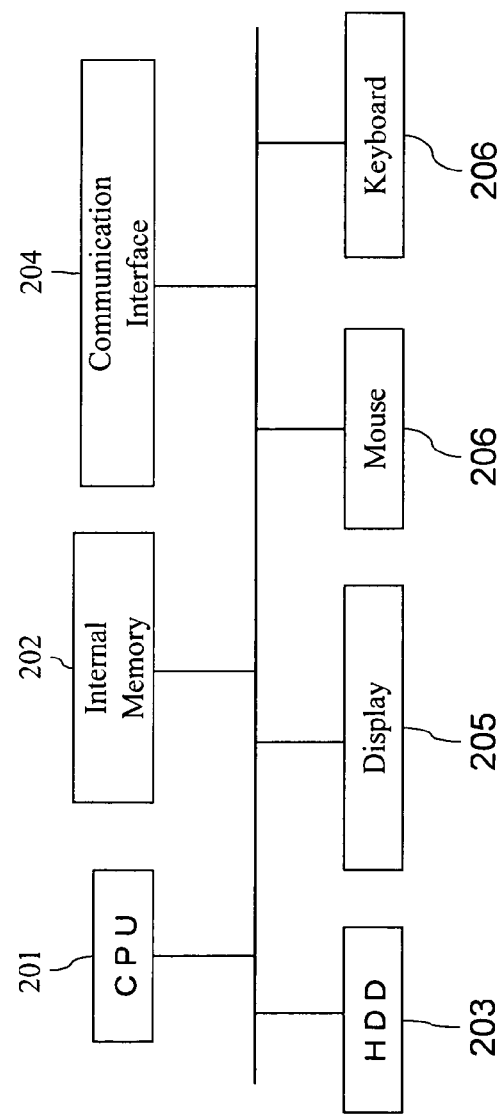
FIG. 4 is a pattern diagram of an equipment configuration showing an internal configuration of a center computer in accordance with the embodiment.

The center computer P2 is a multi-purpose computer having, for example, a server function and comprises, as shown in FIG. 4, a CPU 201, an internal memory 202, an external memory unit 203 such as an HDD, a communication interface 204 such as a modem to connect with a communication network, a display 205 and an input means 206 such as a mouse or a keyboard. Each computer is not limited to a multi-purpose computer and it may be a computer for exclusive use or each computer is not physically separated and may be integrated into a single unit.

Explaining from a functional point of view, the center computer P2 is provided with a similar Web page search function and the terminal computer P1 is provided with an interface function. The similar Web page search function is a function to extract a keyword automatically out of Web pages in a basic Web site and to find a Web page similar to an entire part or a part of the basic Web site out of compared Web sites by making use of the above-mentioned keyword. The interface function is a function to extract a similar portion of an entire Web page or a part of a Web page and to present it to a user based on a behavior of the user.

Figure 5:
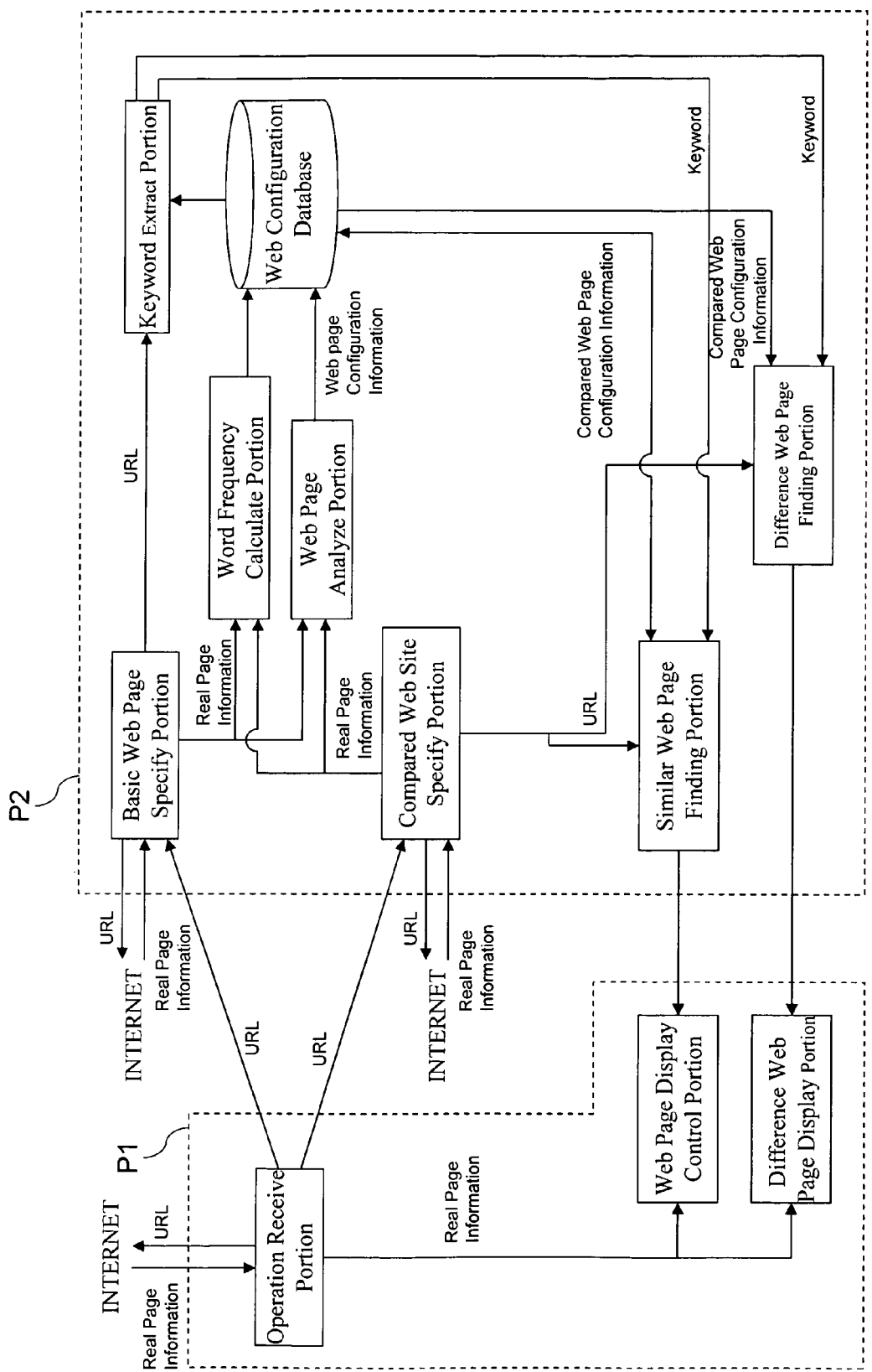
FIG. 5 is a functional block diagram of a content synchronization system of similar Web pages in accordance with the embodiment.

More concretely, as shown in FIG. 5, predetermined programs are installed on each computer and the CPUs 101 and 201 and the peripheral equipment are operated together based on the programs so that this system fulfills its function as a basic Web page specify portion, a compared Web site specify portion, a keyword extract portion, a word frequency calculate portion, a Web page analyze portion, a Web configuration database, a similar Web page finding portion, a difference Web page finding portion, a Web page display control portion, a difference Web page display portion or the like.

Followings are descriptions of each portion and an explanation of an operation of this system.

I. Similar Web Page Search Function (1) Specify Sites

A user designates a URL of a basic Web site and a URL of a compared Web site and selects a Web page that the user wants to browse from the basic Web site. At this time the basic Web site and the compared Web site have a similar content. An operation receive portion of the terminal computer P1 receives an operation by the user. Then the basic Web page specify portion and the compared Web site specify portion specify a site (or a page) based on the designated URLs and determine whether the information on the designated site (or the page) has already been registered in a Web configuration database. If the information is not registered, each of the specify portions obtains all real pages of each site from the Internet. (real page is described as real page information in FIG. 5) Next, an analysis result of each real page which will be explained in (2) and its result are registered in the Web configuration database. If the information is registered, an operation of (3) and below is conducted.

(2) Analysis and Registration of Web Pages

Figure 7:
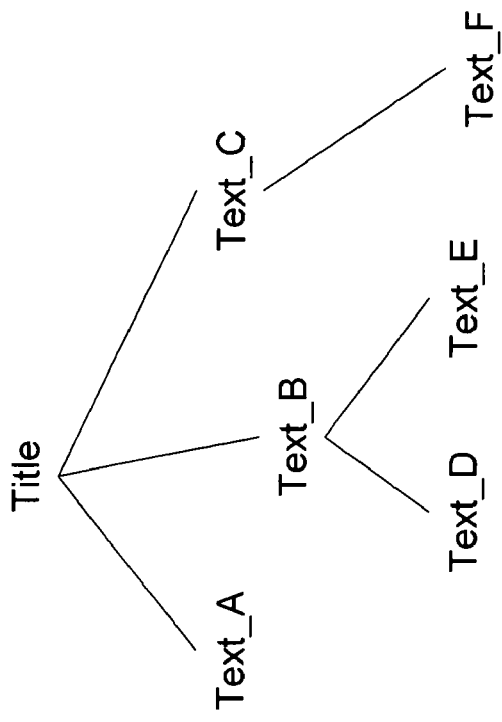
FIG. 7 is a tree structure explanatory diagram showing another example of a tree structure of Web pages in accordance with the embodiment.
Figure 6:
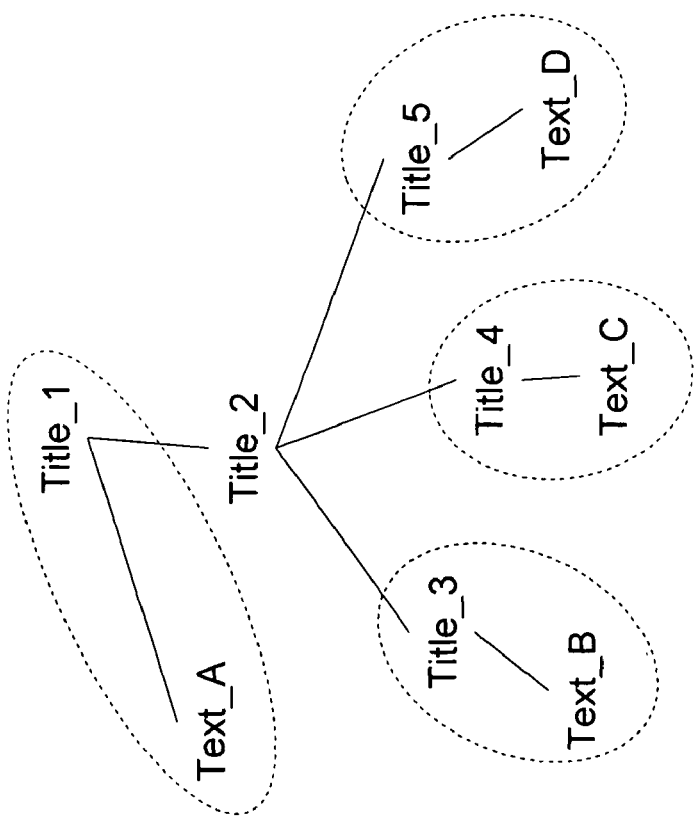
FIG. 6 is a tree structure explanatory diagram showing an example of a tree structure of Web pages in accordance with the embodiment.

The Web page analyze portion makes a tree structure and analyzes paragraphs as shown in FIG. 6 and FIG. 7 by using structure tags of each Web page and identifies a title, a subtitle and a content.

The title and the subtitle are a word or a sentence surrounded by a tag in itself. Or it is often the case that each of the title and the subtitle is written in characters larger than those of other sentences in the Web page or that the characters of the title and the subtitle are emphasized. Then a word or a sentence enclosed by a <Font> tag or an <H> tag and ended with a noun or a proper noun as well is considered a title candidate or a subtitle candidate. A title is a word or a sentence that appears at the top of a Web page and locates at the shallowest and furthest left in the tree structure. A Subtitle is a candidate word or a candidate sentence other than the title. The title and the subtitle have a nested structure.

The word frequency calculate portion calculates a word frequency in a basic Web page, specifies a part of speech for each word by the use of Morphological analysis and obtains vectors for each word based on the word frequency of each word. More concretely, nouns are weighted based on a part of speech and each word vector is calculated with the word frequency multiplied by a word weight by the part of speech. The word weight assigned to each part of speech is, for example, 3.0 to a proper noun, 0.1 to a number, 0.1 to a numerical classifier, 1.0 to a general noun and 0.9 to other nouns.

The Web page configuration information as information on a Web page configuration analyzed by the Web page analyze portion or the word frequency calculate portion is stored in a Web configuration database. A table structure example of the Web configuration database is shown in FIG. 8.

(3) Extract of Keywords

Next, the keyword extract portion extracts keywords from the Web configuration database. More concretely, a word contained in a title or a subtitle is extracted and the extracted word is considered a keyword for each of the title and the subtitle. At this time since the title and the subtitle have a hierarchical structure, the keyword is determined through a breadth-first search of the tree structure. In addition, if all words of nouns or proper nouns contained in a title or a subtitle are considered the keyword, a number of subject keywords might be too many. Accordingly, the word considered the keyword should have a word vector not less than a certain threshold $\alpha$.

The title keywords Ti and the subtitle keywords STxk are considered subject keywords inTitle, where i is a number of title keywords, x is a number of subtitle keywords, and k is a number of keywords for a subtitle. The subject keywords inTitle is defined as $$\text{inTitle}=(Ti, STij, \ldots, STxk)$$

Sentences other than the title or the subtitle are considered to show contents and then a content keyword is extracted. In order to obtain similarity for each part of the basic Web page, content keywords inTexti, i$\in$(1, 2, . . . , n) are obtained from each paragraph of the basic Web page. The content keyword inTexti is a word whose word vectors is not less than a certain threshold $\alpha$. The threshold $\alpha$ is equal to the threshold $\alpha$ of the word vector of the subject keyword. i shows a number of a paragraph. If a word is contained in a sentence showing its content and its word vector is not less than a is considered Ci, where i=1, 2, . . . , n, the content keyword inTexti is defined as $$\text{inTexti}=(C_o, C_1, \ldots, C_n)$$

The content keyword inTexti is ranked by the word vector out of the largest to the smallest.

The content keywords are stored in the Web configuration database.

(4) Search (Specify) of Similar Page

Next, the similar Web page finding portion searches a similar Web page from the compared Web site by the use of the keyword searched and extracted from the basic Web page. Here dealt are a Web page entire part of which is similar to the basic Web page and a Web page whose part is similar to the basic Web page. The part of the Web page here means a paragraph of the Web page. The paragraph of the Web page is a node of a tree structure of the Web page using structure tags. In short in this embodiment, similarity search is conducted in a unit of a node of the tree structure of the Web page. A Web page whose entire part is similar to the basic Web page is a Web page that has the greatest number of similar nodes. A similar Web page similar to the basic Web page is determined from the compared Web site by the use of the subject keyword and the content keyword obtained in the former process of extracting keywords. Since that the subject keywords differ from the content keywords in meanings is experimentally proved, in this embodiment a subject keyword is searched from a title or a subtitle of a compared Web page of a compared Web site and a content keyword is searched from sentences showing a content in a compared Web page of a compared Web site. However, a Web page configuration without a subtitle differs significantly from one with a subtitle. As a result, a search is conducted differently for each case.

a) Web Page Having a Subtitle

In this case, the Web page can be considered a structured Web page. As shown in FIG. 6, child nodes of a title and a subtitle are considered sentences indicating a nature of its content. Then in case that there is a subtitle in the compared Web page, the subtitle and its child node can be treated as a single entity and similar passages are searched as follows.

(1) A passage similar to a subject keyword is searched from a title and/or a subtitle of a compared Web page in the compared Web site. Since the title and the subtitle are within a nested structure, the tree structure is searched through a breadth-first search. If the title and/or the subtitle is similar to the subject keyword, the content as its child node is also considered similar. As a result, no search is conducted for the child node of the title and/or the subtitle similar to the subject keyword. The similarity-degree is computed by the use of the Euclidian distance. In short, the title and/or the subtitle and its child node whose Euclidian distance from a subject keyword feature vector is the least are considered the similar paragraph.

(2) A passage similar to the content keyword is searched from content sentences. A passage similar to a content keyword is searched from sentences of nodes other than a child node of the node whose title and/or subtitle contains the subject keyword. In short, the node whose Euclidian distance from the content keyword feature vector is the least is considered the similar paragraph.

b) Web Page without a Subtitle

In this case, the Web page is considered a non-structured Web page. As shown in FIG. 7, a title is considered a root node, and other nodes are sentences indicating contents. In this case, all nodes are searched through the breadth-first search and a node similar to the content keyword is searched. In short, the node whose Euclidian distance from a content keyword feature vector is the least is considered the similar paragraph.

Paragraphs similar to the basic Web page are found for each compared Web page in the compared Web site. A Web page having the greatest number of similar paragraphs is a similar Web page candidate. If multiple Web pages are candidates to become the similar Web page, the one with the shallowest node and farthest left node in the link tree of the compared Web site is selected as the similar Web page.

(5) Obtain Information on Difference Between the Basic Web Page and the Similar Web Page All the content contained in the basic Web page is not contained in the similar Web page. There are some cases that other page in the compared Web site has some information that is contained in the basic Web page and that is not contained in the similar Web page.

Then in this embodiment a Web page having difference information between the basic Web page and the similar Web page is presented in other window. In the former processing, in the Web page of the compared Web site, a similar paragraph similar to the basic Web page is searched and specified for every paragraph.

The difference Web page finding portion finds a paragraph whose similarity-degree of the subtitle keyword STxj or the content keyword inTexti contained in the paragraph of the basic Web page that does not have a similar paragraph in the similar Web page is the highest from Web pages in the compared Web site other than the similar Web page. The Web page having this paragraph becomes a difference Web page having difference information between the basic Web page and the similar Web page. If there are multiple difference Web page candidates, the one with the shallowest node and farthest left node in the link tree of the compared Web site is selected as the difference Web page.

II. Interface Function

An interface function is a function to present a similar Web page together with the basic Web page and synchronized with an operation of a user such as clicking, scrolling, navigating forward and backward and the Web page display control portion arranged on the terminal computer P1 serves as its function. The user gets a view of this portion.

The interface function will be explained concretely.

(1) Presentation of Similar Web Page When a User Clicks

Figure 9:
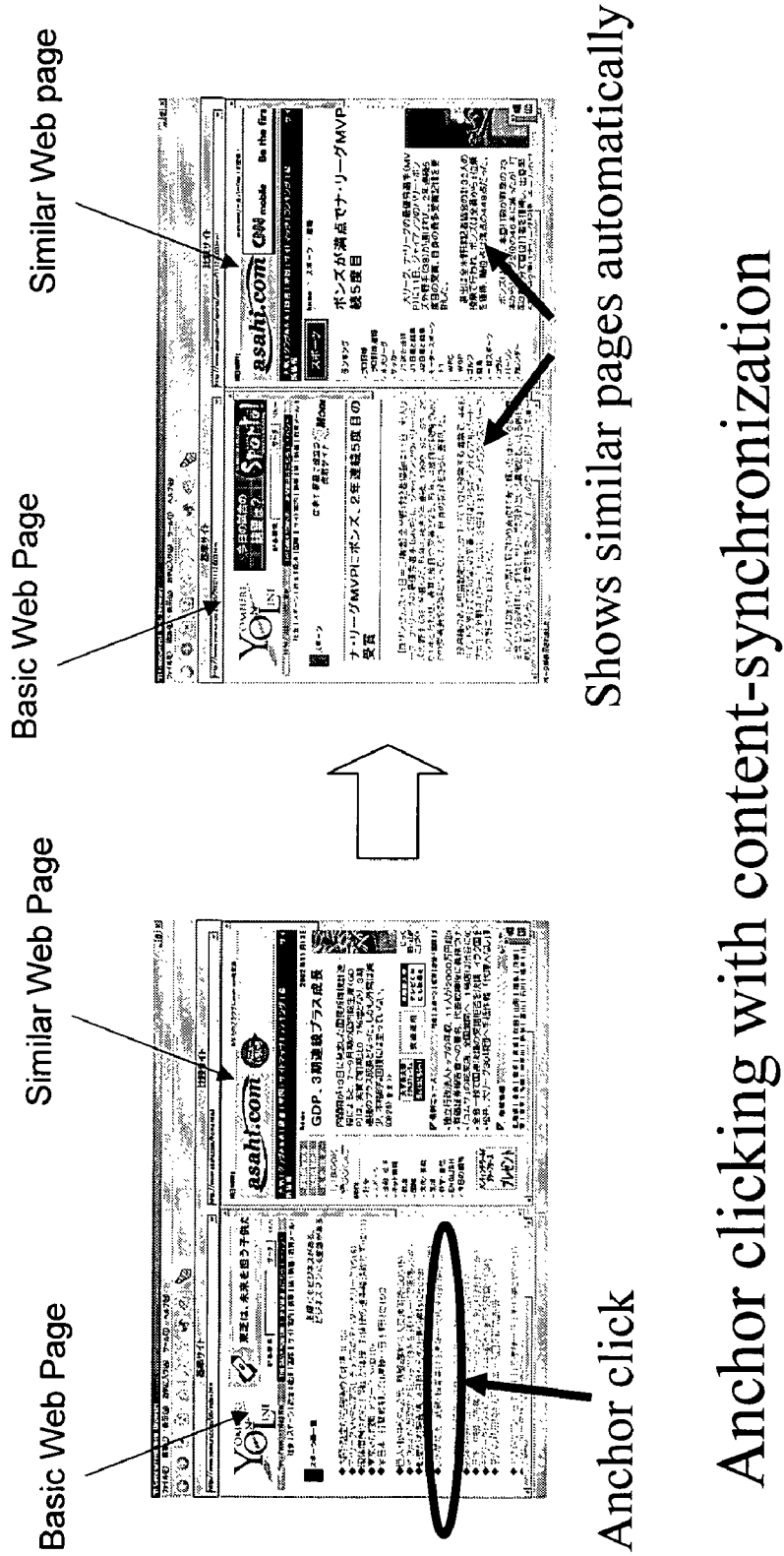
FIG. 9 is a screen view showing an example of a screen transition of a similar Web page when a user clicks an anchor of a basic Web page.

As an example of a display is shown in FIG. 9, when the user clicks an anchor of the basic Web page, a linked page becomes a new basic Web page. Then a keyword is extracted from the new basic Web page, a similar Web page is found from the compared Web site and presented synchronously with the basic Web page. At this time a Web page that has difference information between the basic Web page and the similar Web page is presented in a form of an icon.

(2) Presentation of Similar Part of Similar Web Page When a User Scrolls

Figure 10:
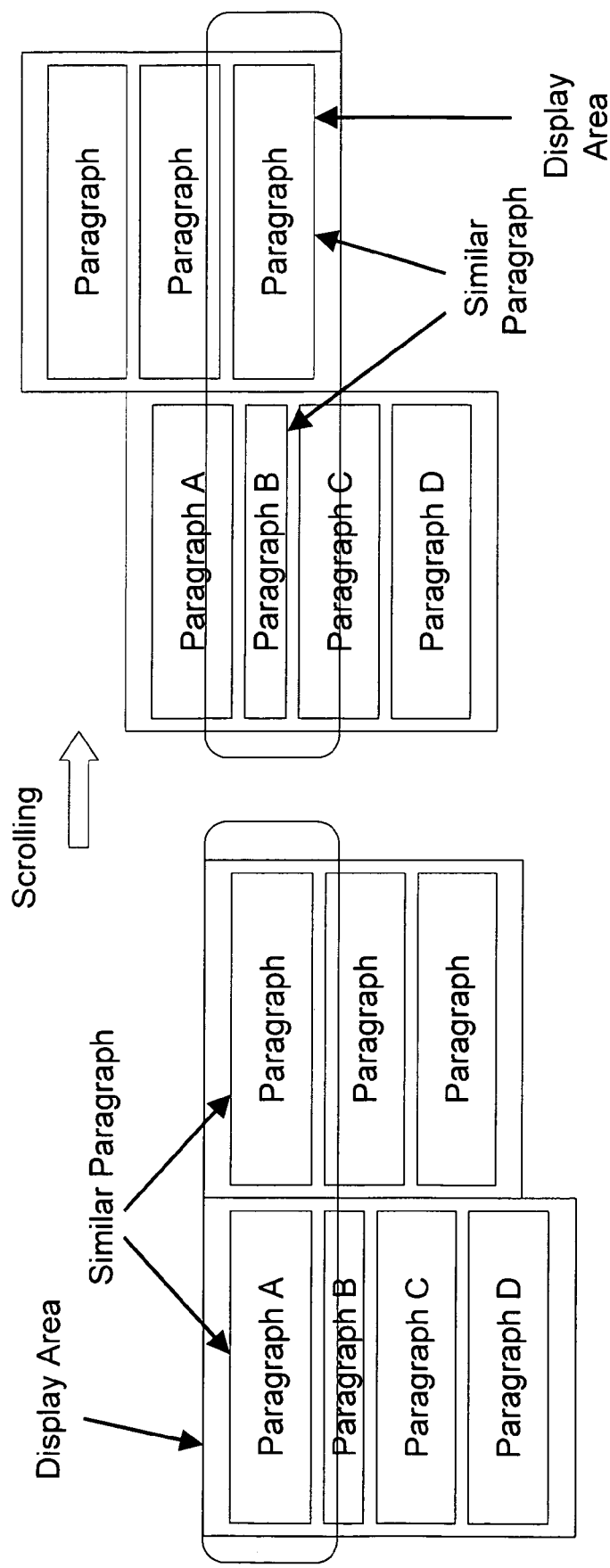
FIG. 10 is a screen transition explanatory view showing a pattern of a screen transition of a similar Web page when a user makes an operation to scroll up or scroll down a basic Web page.
Figure 11:
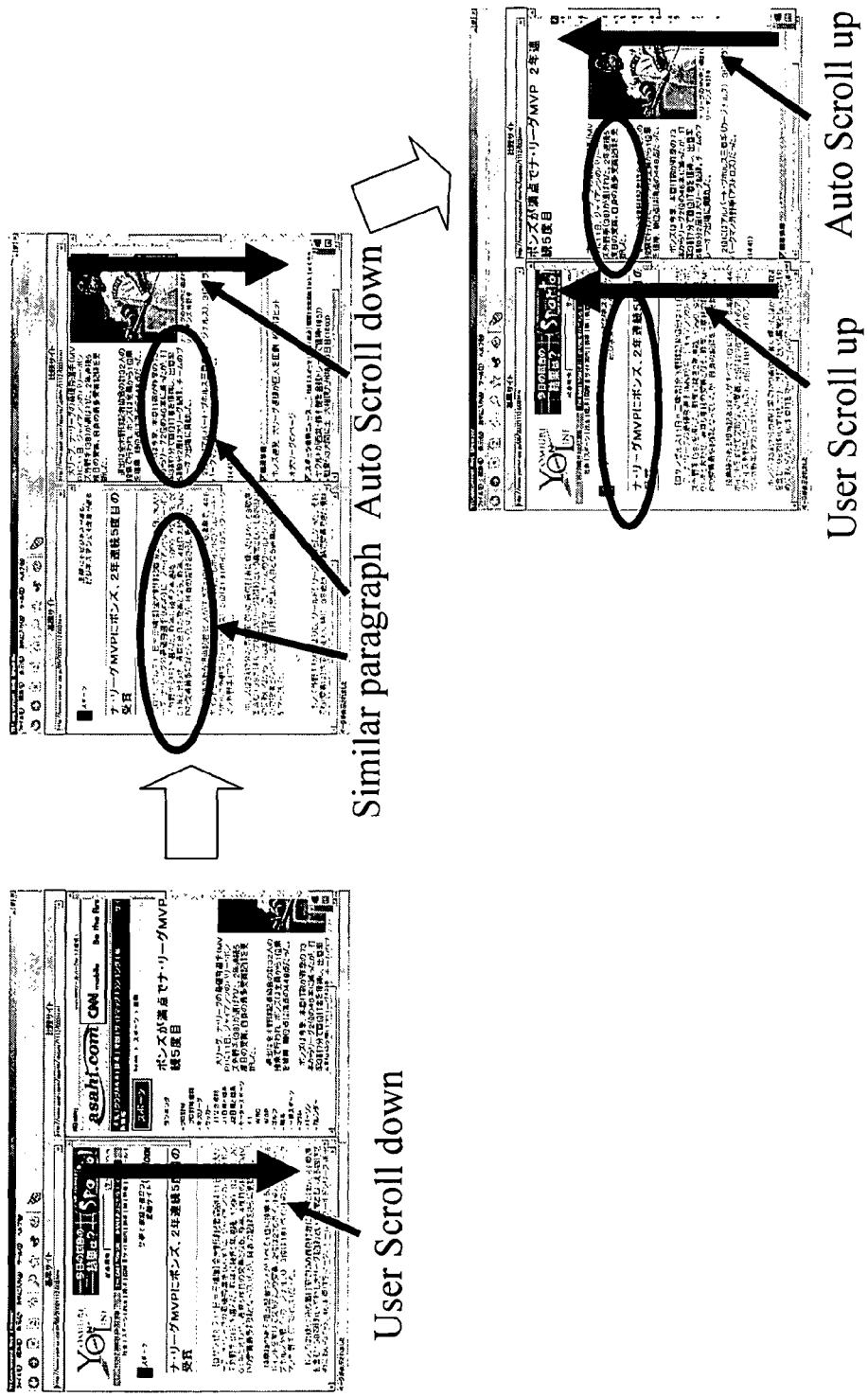
FIG. 11 is a screen view showing an example of a screen transition of a similar Web page when a user makes an operation to scroll up or scroll down a basic Web page.
Figure 12:
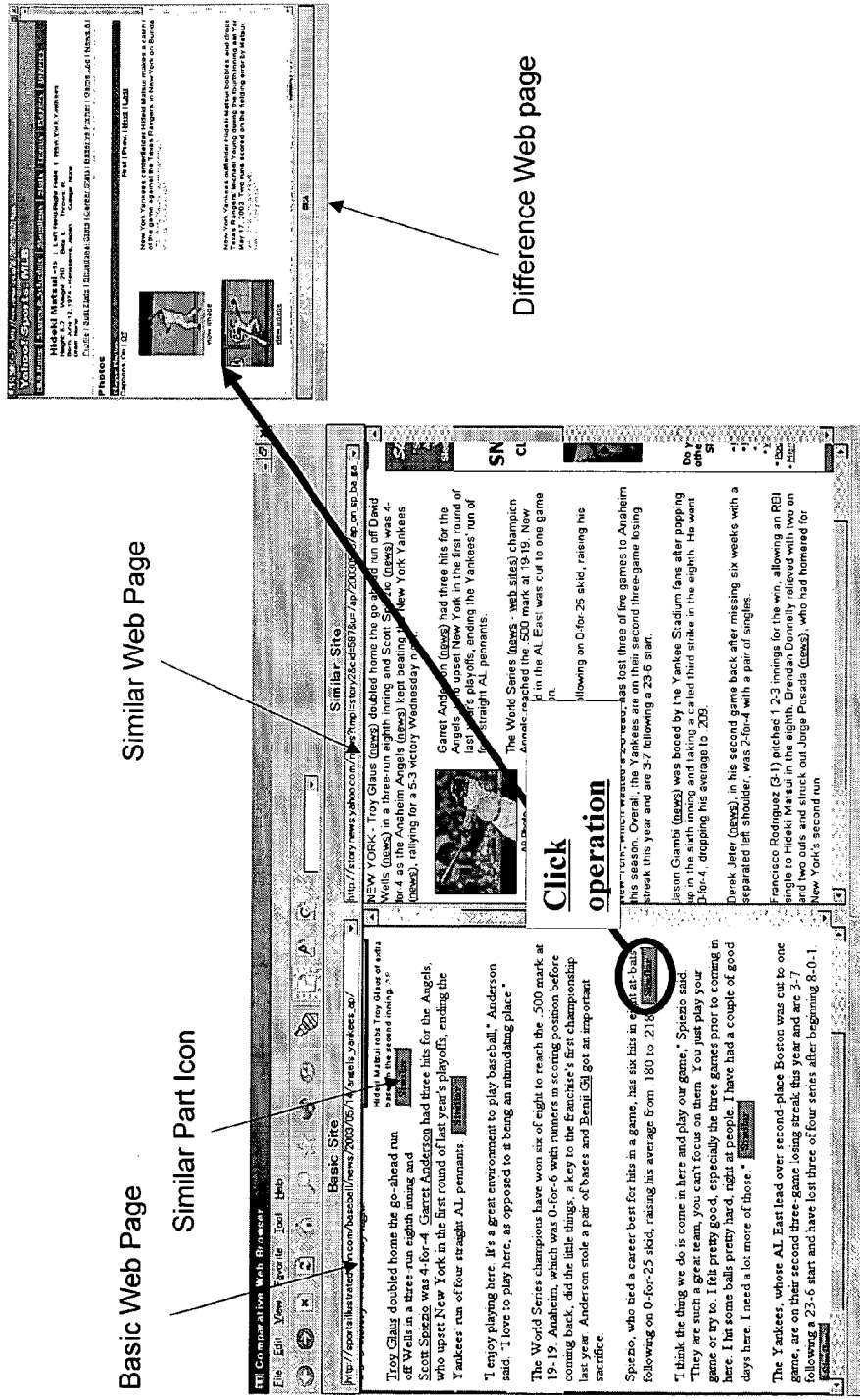
FIG. 12 is a screen view showing a display mode of a difference Web page when a user clicks an icon of a similar portion.

There are a lot of Web pages wherein a length of a page is long. In this case, a user scrolls up or down a window in order to browse this Web page. Then in this embodiment when a user scrolls up or down the basic Web page, a paragraph in a similar Web page that is similar to a paragraph in the basic Web page is automatically scrolled up or down and presented to the user. A pattern diagram is shown in FIG. 10 and an example of a display is shown in FIG. 11. In case of no similar paragraph in the similar Web page as shown in FIG. 12, if a user clicks an icon of the similar part, the difference Web page display portion displays the difference Web page having difference information between the basic Web page and the similar Web page on a different window.

(3) Presentation of Similar Web Page When a User Navigates Backward or Forward

Figure 13:
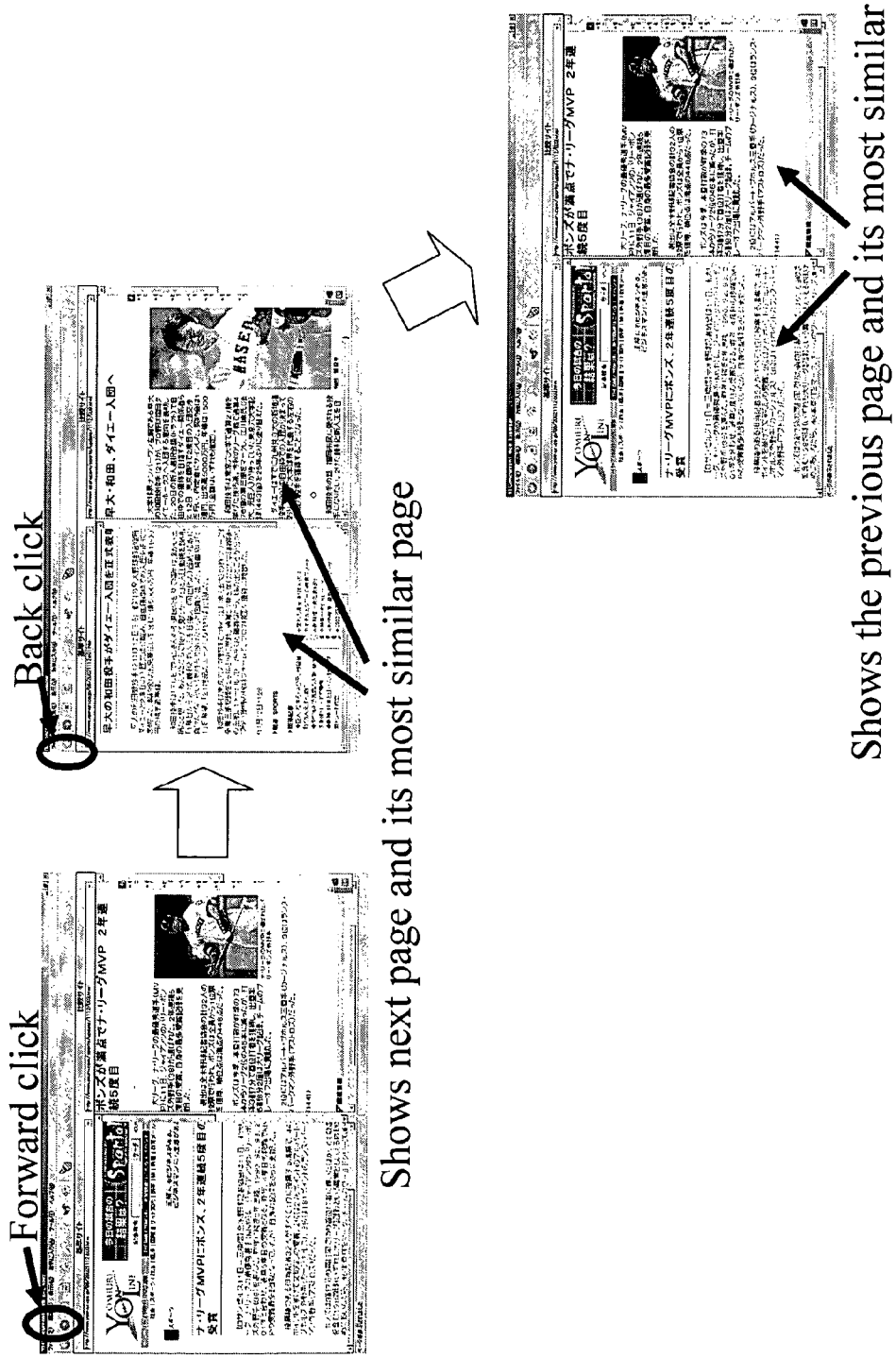
FIG. 13 is a screen view showing an example of a screen transition of a similar Web page when a user makes an access to a previous or a next page again through a back or a forward function of a browser.

When a user browses a previous or a next page again by the use of back or forward function of a browser, the basic Web page and the similar Web page are presented synchronously as an example of a display is shown in FIG. 13.

Figure 14:
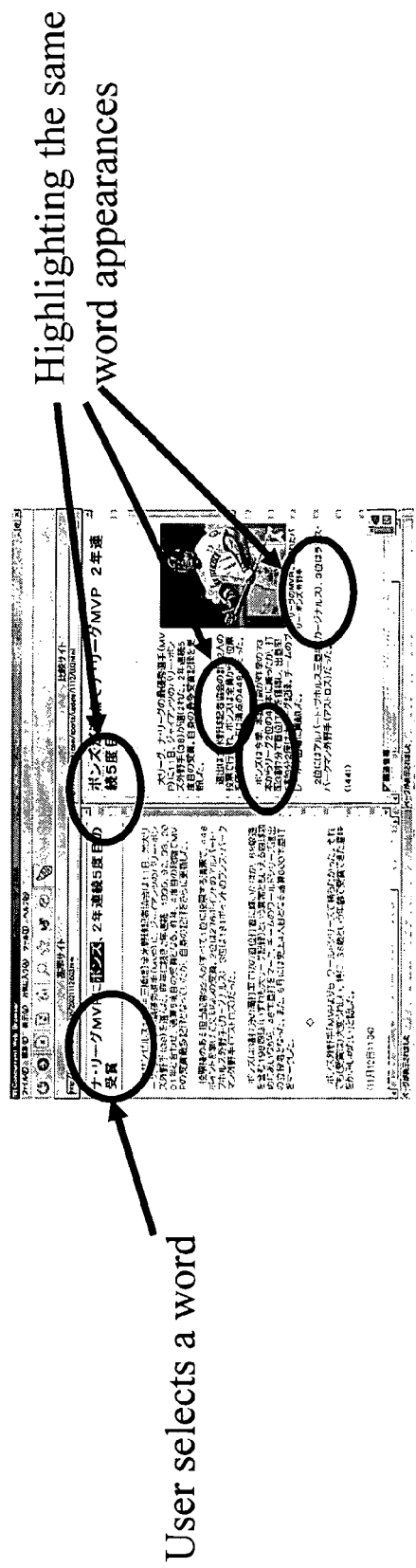
FIG. 14 is a screen view showing a display mode of a similar Web page when a user selects a word in a basic Web page.

(4) Presentation of Similar Web Page When Selecting a Word in the Basic Web Page In this embodiment, a user browses two different Web pages at once. In this case, however, it is conceived that similar information is difficult to obtain at a glance. As a result, as an example of a display is shown in FIG. 14, a word selected by a user in the basic Web page is presented in a mode different from other words such that the selected word is highlighted in the similar Web page so that the user can obtain similar information viscerally.

III. Summary

As mentioned above, the system in accordance with this embodiment extracts a keyword from a basic Web page in a basic Web site specified by a user, automatically finds a similar Web page from compared Web sites by the use of the keyword and presents it simultaneously. The keyword comprises a subject keyword and a content keyword and the subject keyword is used for searching a title and/or a subtitle and the content keyword is used for searching contents. The similar Web page is found by the use of a tree structure of a Web page configuration. By using this system a user can browse a similar Web page in compared Web sites with ease just by browsing Web pages one by one in the basic Web site sequentially.

The present claimed invention is not limited to the embodiment. There may be various modifications without departing from a spirit of this invention, for example, multiple similar Web pages similar to the basic Web page may be presented simultaneously and synchronously.

The invention claimed is:

1. A content synchronization system of similar Web pages comprising:
   a basic Web page specify portion that receives an identifier of a basic Web page as a Web page to be a basis of display and specifies the basic Web page;
   a compared Web site specify portion that receives an identifier of a compared Web site as a compared object of the basic Web page and specifies the compared Web page;
   a keyword extract portion that extracts a keyword in the basic Web page specified by the basic Web page specify portion;
   a similar Web page finding portion that specifies one or multiple similar Web pages that are similar to an entire part or a part of the basic Web page in the compared Web sites based on the keyword extracted by the keyword extract portion; and
   a Web page display control portion that displays the similar Web pages specified by the similar Web page finding portion together with the basic Web page and synchronized with an operation to the basic Web page,
   wherein when the operation is performed by a user on the basic Web page, the Web page display control portion displays in a synchronized manner a same type of operation being performed on the similar Web page.

2. The content synchronization system of similar Web pages described in claim 1, and further comprising a word frequency calculate portion that calculates frequency of a word in an entire or a part of a Web page and the keyword extract portion extracts a word whose frequency is not less than a predetermined threshold from words that appear in the basic Web page as the keyword.

3. The content synchronization system of similar Web pages described in claim 1, wherein the word frequency calculate portion specifies a part of speech of each word by a Morphological analysis and calculates the word frequency by multiplying a number of each word appearance by a weight factor that has been previously determined.

4. The content synchronization system of similar Web pages described in claim 1, and further comprising a Web page analyze portion that divides a title, a subtitle and a content sentence of a Web page by analyzing a structure of the Web page.

5. The content synchronization system of similar Web pages described in claim 4, wherein the keyword extract portion extracts a first keyword from words contained in the title and the subtitle and considers the first keyword as a subject keyword and also extracts a second keyword from words contained in the content sentence and considers the second keyword as a content keyword,
   the similar Web page finding portion searches a title and a subtitle of the compared Web page based on the subject keyword or searches a content sentence of the compared Web page based on the content keyword and extracts a similar Web page from a result of the above.

6. The content synchronization system of similar Web pages described in claim 1, wherein the similar Web page finding portion considers a Web page that is the most similar to the basic Web page among the compared Web pages as the similar Web page.

7. The content synchronization system of similar Web pages described in claim 6, wherein the similar Web page finding portion considers a paragraph from the compared Web page that contains keywords over a predetermined number as a similar paragraph, and considers a compared Web page with a largest number of paragraphs judged as the similar paragraph, as the similar Web page.

8. The content synchronization system of similar Web pages described in claim 1, wherein the Web page display control portion displays the basic Web page and the similar Web page on a same window.

9. The content synchronization system of similar Web pages described in claim 1, wherein the Web page display control portion displays a part of the similar Web page that is similar to the part displayed out of the basic Web page.

10. The content synchronization system of similar Web pages described in claim 1, wherein the Web page display control portion displays a word in the similar Web page that is the same as a word that is selected in the basic Web page in a mode different from other words in the similar Web page.

11. The content synchronization system of similar Web pages described in claim 1, and further comprising:
    a difference Web page finding portion that specifies a difference Web page as a Web page having difference information that is contained in the basic Web page and that is not contained in the similar Web page from the compared Web site; and
    a difference Web page display portion that makes it possible to display one or multiple difference Web pages specified by the difference Web page finding portion together with the basic Web page and the similar Web page simultaneously.

12. The content synchronization system of similar Web pages described in claim 11, wherein the difference Web page display portion displays the difference Web page in a form of an icon and the difference Web page is displayed by a predetermined operation applied to the icon.

13. A content synchronization method of similar Web pages comprising
   a basic Web page specify step that receives an identifier of a basic Web page as a Web page to be a basis of display and specifies the basic Web page;
   a compared Web site specify step that receives an identifier of a compared Web site as a Web page to be compared of the basic Web page and specifies the compared Web page;
   a keyword extract step that extracts a keyword in the basic Web page specified by the basic Web page specify step;
   a similar Web page extract step that extracts one or multiple similar Web pages that are similar to an entire part or a part of the basic Web page in the compared Web sites based on the keyword extracted by the keyword extract step; and
   a Web page display control step that displays the similar Web pages extracted by the similar Web page extract step together with the basic Web page simultaneously
   wherein a part of the similar Web page that is similar to the part displayed out of the basic Web page is displayed in the Web page display control step and when the part of the basic Web page is scrolled, the part of similar Web page that is similar to the part of the basic Web page is scrolled.

14. The content synchronization system of similar Web pages described in claim 1 wherein the word in the similar Web page that is the same as the word that is selected in the basic Web page is highlighted.

15. A content synchronization system of similar Web pages comprising:
   a basic Web page specify portion that receives an identifier of a basic Web page as a Web page to be a basis of display and specifies the basic Web page;
   a compared Web site specify portion that receives an identifier of a compared Web site as a compared object of the basic Web page and specifies the compared Web page;
   a keyword extract portion that extracts a keyword in the basic Web page specified by the basic Web page specify portion;
   a similar Web page finding portion that specifies one or multiple similar Web pages that are similar to an entire part or a part of the basic Web page in the compared Web sites based on the keyword extracted by the keyword extract portion; and
   a Web page display control portion that displays the similar Web pages specified by the similar Web page finding portion together with the basic Web page and synchronized with an operation to the basic Web page,
   when the part of the basic Web page is scrolled, the Web page display control portion scrolls the part of similar Web page that is similar to the part of the basic Web page.

16. A content synchronization method of similar Web pages comprising:
   a basic Web page specify step that receives an identifier of a basic Web page as a Web page to be a basis of display and specifies the basic Web page;
   a compared Web page specify step that receives an identifier of a compared Web site as a Web page to be compared of the basic Web page and specifies the compared Web page;
   a keyword extract step that extracts a keyword in the basic Web page specified by the basic Web page specify step;
   a similar Web page extract step that extracts one or multiple similar Web pages that are similar to an entire part or a part of the basic Web page in the compared Web sites based on the keyword extracted by the keyword extract step; and
   a Web page display control step that displays the similar Web pages extracted by the similar Web page extract step together with the basic Web page simultaneously,
   wherein when the operation is performed by a user on the basic Web page in the Web page display control step, a same type of operation being performed on the similar Web page is performed in a synchronized manner.

\* \* \* \* \*